(12) United States Patent
Chao et al.

(10) Patent No.: US 12,150,118 B2
(45) Date of Patent: Nov. 19, 2024

(54) RESOURCE CONFIGURATION FOR NB-IOT

(71) Applicant: Nokia Technologies Oy, Espoo (FI)

(72) Inventors: Hua Chao, Shanghai (CN); Srinivasan Selvaganapathy, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 561 days.

(21) Appl. No.: 17/432,544

(22) PCT Filed: Feb. 22, 2019

(86) PCT No.: PCT/CN2019/075960
§ 371 (c)(1),
(2) Date: Aug. 20, 2021

(87) PCT Pub. No.: WO2020/168576
PCT Pub. Date: Aug. 27, 2020

(65) Prior Publication Data
US 2022/0150925 A1    May 12, 2022

(51) Int. Cl.
*H04W 72/21* (2023.01)
*H04W 48/16* (2009.01)
*H04W 72/1268* (2023.01)

(52) U.S. Cl.
CPC ....... *H04W 72/1268* (2013.01); *H04W 48/16* (2013.01); *H04W 72/21* (2023.01)

(58) Field of Classification Search
CPC . H04W 72/1268; H04W 48/16; H04W 72/21; H04W 72/23; H04W 76/27
See application file for complete search history.

(56) References Cited

U.S. PATENT DOCUMENTS

2022/0007391 A1*   1/2022   Hoglund ........... H04W 72/1268

FOREIGN PATENT DOCUMENTS

| CN | 102484765 A | 5/2012 |
|---|---|---|
| CN | 108304961 A | 7/2018 |
| GB | 2579792 A | 7/2020 |

(Continued)

OTHER PUBLICATIONS

"Email discussion [104#43][eMTC & NB-IoT R16] D-PUR report", Sierra Wireless, R2-1900120, 3GPP TSG-RA WG2 Meeting #105, Mar. 2019, 45 pages.

(Continued)

*Primary Examiner* — Chuong A Ngo
(74) *Attorney, Agent, or Firm* — Harrington & Smith

(57) ABSTRACT

Embodiments of the present disclosure relate to the resource configuration for Narrow Band Internet of Thing (NB-IoT). A method of resource configuration for NB-IoT includes determining, at a network device, whether a configured Uplink Resource (PUR) for transmission from a terminal device to the network device is to be adjusted; in response to determining that the PUR is to be adjusted, determining a set of resources to be allocated for further transmission from the terminal device to the network device based on a Transport Block Size (TBS) associated with the further transmission; generating reconfiguration information of the PUR based on the set of the resources; and transmitting the reconfiguration information to the terminal device. In this way, the resource configuration may be determined and adjusted more efficiently and flexibility compared to the conventional way.

19 Claims, 4 Drawing Sheets

(56) References Cited

FOREIGN PATENT DOCUMENTS

| WO | WO 2015/080887 A1 | 6/2015 |
| WO | WO-2018/080561 A1 | 5/2018 |

OTHER PUBLICATIONS

"PUR Configuration", Ericsson, Tdoc: R2-1900736, 3GPP TSG-RAN WG2 #105, Mar. 2019, 12 pages.

"Further consideration on DL aspects of D-PUR in IDLE", ZTE Corporation, Sanechips, R21901479, 3GPP TSG-RAN2 meeting #105, Mar. 2019, 8 pages.

3GPP TSG RAN WG1 Meeting #94, Gothenburg, Sweden, Aug. 20-24, 2018, R1-1808431, "Transmission in preconfigured UL resources", Nokia, Nokia Shanghai Bell, 4 pgs.

3GPP TSG RAN WG1 Meeting #94, Gothenburg, Sweden, Aug. 20-24, 2018, R1-1808440, "Preconfigured Grant Uplink transmission", Nokia, Nokia Shanghai Bell, 4 pgs.

"Transmission in preconfigured UL resources", Nokia, Nokia Shanghai Bell, 3GPP TSG RAN WGI Meeting #94, R1-1808431, Aug. 2018, 4 pages.

* cited by examiner

RESOURCE CONFIGURATION FOR NB-IOT

CROSS REFERENCE TO RELATED APPLICATION

This patent application is a U.S. National Stage application of International Patent Application Number PCT/CN2019/075960 filed Feb. 22, 2019, which is hereby incorporated by reference in its entirety.

FIELD

Embodiments of the present disclosure generally relate to the field of telecommunication and in particular, to the resource configuration for Narrow Band Internet of Thing (NB-IoT).

BACKGROUND

Some research improvements are proposed to improve the Uplink (UL) transmission efficiency and/or user Equipment (UE) power consumption, for example, specify support for transmission in preconfigured resources in idle and/or connected mode based on Single Carrier-Frequency Division Multiple Access (SC-FDMA) waveform for UEs with a valid timing advance.

Currently, it has been considered removing the need for MESSAGE 1 and MESSAGE 2 in an access procedure by using a PUR (Preconfigured Uplink Resource). Specifically, the dedicated PUR (D-PUR) is defined as a Narrow Physical Uplink Shared Channel (NPUSCH) resource, which may be used by a single UE and is contention-free. It is decided that an evolved NodeB (eNB) may configure the dedicated PUR via Radio Resource Control (RRC) dedicated signalling and a periodic D-PUR with duration may be supported.

SUMMARY

In general, example embodiments of the present disclosure provide a solution for the resource configuration for NB-IoT.

In a first aspect, there is provided a method for the resource configuration for NB-IoT. The method comprises determining, at a network device, whether a Preconfigured Uplink Resource (PUR) for transmission from a terminal device to the network device is to be adjusted; in response to determining that the PUR is to be adjusted, determining a set of resources to be allocated for further transmission from the terminal device to the network device based on a Transport Block Size (TBS) associated with the further transmission; generating reconfiguration information of the PUR based on the set of the resources; and transmitting the reconfiguration information to the terminal device.

In a second aspect, there is provided a method for the resource configuration for NB-IoT. The method comprises receiving, at a terminal device, reconfiguration information of Preconfigured Uplink Resource (PUR) from a network device, the PUR being used for transmission from a terminal device to the network device, the reconfiguration information being generated by the network device based on a set of resources to be allocated for further transmission from the terminal device to the network device, the set of resources being determined by the network device based on a Transport Block Size (TBS) associated with the further transmission in response to determining that the PUR is to be adjusted; and performing the further transmission based on the reconfiguration information.

In a third aspect, there is provided a network device for the resource configuration for NB-IoT. The device comprises at least one processor; and at least one memory including computer program codes; the at least one memory and the computer program codes are configured to, with the at least one processor, cause the device at least to determine, at a network device, whether a Preconfigured Uplink Resource (PUR) for transmission from a terminal device to the network device is to be adjusted; in response to determining that the PUR is to be adjusted, determine a set of resources to be allocated for further transmission from the terminal device to the network device based on a Transport Block Size (TBS) associated with the further transmission; generate reconfiguration information of the PUR based on the set of the resources; and transmit the reconfiguration information to the terminal device.

In a fourth aspect, there is provided a terminal device for the resource configuration for NB-IoT. The device comprises at least one processor; and at least one memory including computer program codes; the at least one memory and the computer program codes are configured to, with the at least one processor, cause the device at least to receive, at a terminal device, reconfiguration information of Preconfigured Uplink Resource (PUR) from a network device, the PUR being used for transmission from a terminal device to the network device, the reconfiguration information being generated by the network device based on a set of resources to be allocated for further transmission from the terminal device to the network device, the set of resources being determined by the network device based on a Transport Block Size (TBS) associated with the further transmission in response to determining that the PUR is to be adjusted; and perform the further transmission based on the reconfiguration information.

In a fifth aspect, there is provided an apparatus comprising means to perform the steps of the method according to the first aspect. The apparatus comprises means for determining, at a network device, whether a Preconfigured Uplink Resource (PUR) for transmission from a terminal device to the network device is to be adjusted; means for in response to determining that the PUR is to be adjusted, determining a set of resources to be allocated for further transmission from the terminal device to the network device based on a Transport Block Size (TBS) associated with the further transmission; means for generating reconfiguration information of the PUR based on the set of the resources; and means for transmitting the reconfiguration information to the terminal device.

In a sixth aspect, there is provided an apparatus comprising means to perform the steps of the method according to the second aspect. The apparatus comprises means for receiving, at a terminal device, reconfiguration information of Preconfigured Uplink Resource (PUR) from a network device, the PUR being used for transmission from a terminal device to the network device, the reconfiguration information being generated by the network device based on a set of resources to be allocated for further transmission from the terminal device to the network device, the set of resources being determined by the network device based on a Transport Block Size (TBS) associated with the further transmission in response to determining that the PUR is to be adjusted; and means for performing the further transmission based on the reconfiguration information.

In a seventh aspect, there is provided a computer readable medium having a computer program stored thereon which, when executed by at least one processor of a device, causes the device to carry out the method according to the first aspect.

In an eighth aspect, there is provided a computer readable medium having a computer program stored thereon which, when executed by at least one processor of a device, causes the device to carry out the method according to the second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
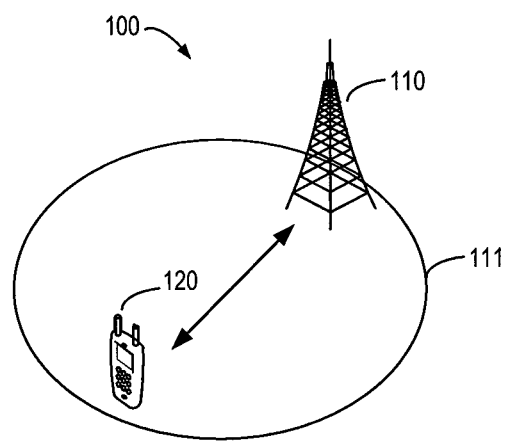
FIG. 1 shows an example communication network 100 in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "communication network" refers to a network that follows any suitable communication standards or protocols such as long term evolution (LTE), LTE-Advanced (LTE-A) and 5G NR, and employs any suitable communication technologies, including, for example, Multiple-Input Multiple-Output (MIMO), OFDM, time division multiplexing (TDM), frequency division multiplexing (FDM), code division multiplexing (CDM), Bluetooth, ZigBee, machine type communication (MTC), eMBB, mMTC and uRLLC technologies. For the purpose of discussion, in some embodiments, the LTE network, the LTE-A network, the 5G NR network or any combination thereof is taken as an example of the communication network.

As used herein, the term "network device" refers to any suitable device at a network side of a communication network. The network device may include any suitable device in an access network of the communication network, for example, including a base station (BS), a relay, an access point (AP), a node B (NodeB or NB), an evolved NodeB (eNodeB or eNB), a gigabit NodeB (gNB), a Remote Radio Module (RRU), a radio header (RH), a remote radio head (RRH), a low power node such as a femto, a pico, and the like. For the purpose of discussion, in some embodiments, the eNB is taken as an example of the network device.

The network device may also include any suitable device in a core network, for example, including multi-standard radio (MSR) radio equipment such as MSR BSs, network controllers such as radio network controllers (RNCs) or base station controllers (BSCs), Multi-cell/multicast Coordination Entities (MCEs), Mobile Switching Centers (MSCs) and MMEs, Operation and Management (O&M) nodes, Operation Support System (OSS) nodes, Self-Organization Network (SON) nodes, positioning nodes, such as Enhanced Serving Mobile Location Centers (E-SMLCs), and/or Mobile Data Terminals (MDTs).

As used herein, the term "terminal device" refers to a device capable of, configured for, arranged for, and/or operable for communications with a network device or a further terminal device in a communication network. The communications may involve transmitting and/or receiving wireless signals using electromagnetic signals, radio waves, infrared signals, and/or other types of signals suitable for conveying information over air. In some embodiments, the terminal device may be configured to transmit and/or receive information without direct human interaction. For example, the terminal device may transmit information to the network device on predetermined schedules, when triggered by an internal or external event, or in response to requests from the network side.

Examples of the terminal device include, but are not limited to, user equipment (UE) such as smart phones, wireless-enabled tablet computers, laptop-embedded equipment (LEE), laptop-mounted equipment (LME), and/or wireless customer-premises equipment (CPE). For the purpose of discussion, in the following, some embodiments will be described with reference to UEs as examples of the terminal devices, and the terms "terminal device" and "user equipment" (UE) may be used interchangeably in the context of the present disclosure.

As used herein, the term "cell" refers to an area covered by radio signals transmitted by a network device. The terminal device within the cell may be served by the network device and access the communication network via the network device.

As used herein, the term "circuitry" may refer to one or more or all of the following:
  (a) hardware-only circuit implementations (such as implementations in only analog and/or digital circuitry) and
  (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

FIG. 1 illustrates a communication network 100 in which embodiments of the present disclosure can be implemented. The communication network 100 may comply with any suitable protocol or standard that already exists or will be developed in the future. In some embodiments, the communication network 100 may be the LTE (or LTE-A) network, the NR network or combination thereof.

The communication network 100 comprises a network device 110. The network device 110 serves a terminal device 120 in a cell 111. It is to be understood that the numbers of network devices and terminal devices are shown only for the purpose of illustration without suggesting any limitation. The communication network 100 may include any suitable numbers of network devices and terminal devices. The communication between the network device 110 and the terminal device 120 may utilize any suitable technology that already exists or will be developed in the future.

Currently, it has been considered removing the need for MESSAGE 1 and MESSAGE 2 in an accesses procedure by using a PUR (Preconfigured Uplink Resource). A dedicated PUR (D-PUR) is defined as a Narrow Physical Uplink Shared Channel (NPUSCH) resource and may be allocated for a specific UE to avoid the contention. It has been decided that the eNB may configure the dedicated PUR via RRC signalling and a periodic D-PUR with duration may be supported.

Compared to the scheduling-based resource allocation, the D-PUR is a reserved way without accurate buffer size exchange. The FFS is method for the eNB to obtain information used to help configuring the dedicated preconfigured uplink resource to the UE. The improper resource allocation method will result in resource waste.

Furthermore, when the eNB allocates one D-PUR for a UE. The D-PUR information may be stored in both the eNB and the UE. It is not discussed yet on how to create and maintain the information.

An approach proposed that the PUR may reuse the same max Transport Block Size (TBS) and same UL TBS table specified for Early Data Transmission (EDT) in Random Access (RA) procedure.

A further approach proposed that the PUR TBS is limited to the max TBS supported by the UE category. There is no accurate TBS allocation step for EDT and the performance relies on the blind decoding of the eNB. EDT is a kind of one chance transmission, if reusing the EDT way for D-PUR, it is not efficient especially for periodic services.

A yet approach proposed to add data volume size into the Subscription Based UE Differentiation Information from the MME to the eNB to help it to determine the TBS. It is not flexible to obtain the data volume size as part of the subscription data, which may only work when the MCS is fixed for the UE and known by the eNB.

Further, since the UE applying D-PUR is in idle mode, the D-PUR information may not be stored in the eNB as UE context. There is no solution on D-PUR information storage yet.

Therefore, embodiments of the present disclosure proposed a method of resource configuration for NB-IoT. The procedure of the resource configuration may involve an initial phase (i.e. configuring phase) and an adjusting phase (i.e. reconfiguring phase). Both eNB and UE may trigger the procedure of the resource configuration.

Principle and implementations of the present disclosure will be described in detail below with reference to FIG. 2, which shows process 200 according to example embodiments of the present disclosure. For the purpose of discussion, the process 200 will be described with reference to FIG. 1. The process 200 may involve the resource configuration for NB-IoT.

Figure 2:
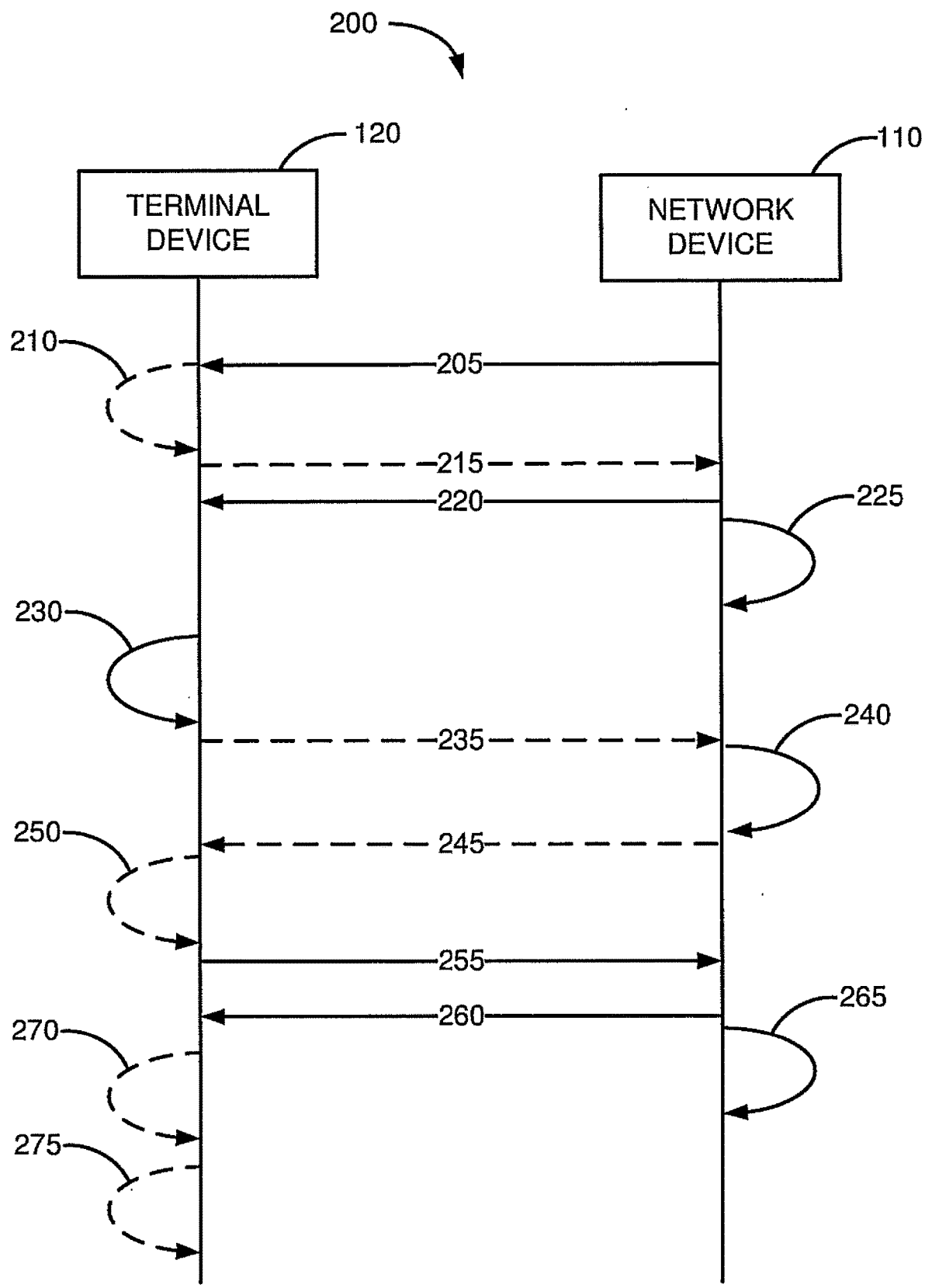
FIG. 2 shows a diagram of an example process 200 for the resource configuration for NB-IoT according to some example embodiments of the present disclosure.

As shown in FIG. 2, the network device 110 may determine which cell may support PUR. In some embodiments, the EDT capable cells may be considered as candidate cells for PUR, for example, the cell 111 shown in FIG. 1. Then the network device may generate a PUR indication in the EDT TBS parameters to show whether those EDT TBS parameters may be used by the terminal device 120, which is served by the cell 111.

The network device 110 may further transmit a D-PUR indication in the System Information Block (SIB) 205 to inform the terminal device 120 that the cell 111 may support D-PUR to reuse the TBS information of EDT.

Then the network device 110 may determine the configuration of the PUR. In some embodiments, the configuration of the PUR may be determined by the network device 110 based on the Coverage Extension Level (CEL) of the terminal device 120 detected by itself. As another option, the terminal device 120 may request the configuration of the PUR based on the data volume size to be transmitted to the network device 110 and the Coverage Extension Level (CEL) of the terminal device 120. With reference to the actions 210 to 230, both cases for the initial phase (i.e. configuring phase) may be explained in detail.

If the initial phase is triggered by the terminal device 120. The terminal device 120 may determine 210 an expected TBS based on the Coverage Extension Level (CEL) and the data volume size from higher layer. The expected TBS as used herein may indicate a required size for transmitting the data from the terminal device 120.

In this case, the terminal device 120 may determine different expected TBSs and periodicity details based on the multiple D-PUR services from network device 110. In addition to the D-PUR service flows, the terminal device 120 may also indicate service which requires PUR whose traffic pattern is not deterministic with the possible TBS size.

The terminal device 120 may transmit 215 the request for the configuration of PUR to the network device 110. This request may comprise the expect TBS and may be transmitted via RRC signalling. If the network device 110 receives the request, the network device 120 may determine the configuration of the PUR based on the initial TBS and channel state between the terminal device and the network device, for example, the CEL. Such configuration of the PUR may be considered as dedicated PUR (D-PUR), which means the configuration of PUR may be used only for a specific terminal device, for example, the terminal device 120.

In some embodiments, an identifier of the service is encapsulated in the NAS message in the RRC signalling for D-PUR request.

In some embodiments, the configuration at least comprising a configured TBS for the uplink transmission, a set of resources to be allocated for the uplink transmission and a PUR Radio Network Temporary Identity (RNTI). The PUR RNTI may be allocated to the terminal device 120 to indicate that the terminal device to monitor the NPDCCH scrambled by the PUR RNTI to determine if it needs to perform mode transition for receiving the reconfiguration.

The network device 110 may transmit 220 the configuration of the PUR to the terminal device 120 and create 225 the D-PUR context accordingly. Correspondingly, the terminal device 120 may also create 230 the D-PUR context after receiving the configuration of the PUR. In some embodiments, the context may comprise the identity of the terminal device, the identity of the service, the allocated resources, TBS and the repetition number for the transmission.

Alternatively, if the initial phase is triggered by the network device 110, the network device 110 may assign resources to each of the service flow with resource allocation configuration along with a configured TBS for the service having fixed traffic pattern and determine the configuration of the PUR based on the allocated resources. Such allocated resource may be considered as a common PUR.

In some embodiments, for the service which requires uplink transmission whose timing is not deterministic, the network device 110 may assign the resources with the maximum TBS and also smaller TBS supported in these common resources. The network device 110 may also use the EDT TBS as the configured TBS to be used for this common PUR.

Similarly, for this case, the network device 110 may transmit 220 the configuration of the PUR to the terminal device 120 and create 225 the D-PUR context accordingly. Correspondingly, the terminal device 120 may also create 230 the D-PUR context after receiving the configuration of the PUR. In some embodiments, the context may comprise the identifier of the terminal device, the identifier of the service, the allocated resources, TBS and the repetition number for the transmission.

In this way, both the terminal device 120 and the network device 110 may trigger the procedure of the configuration. Furthermore, the D-PUR information may be stored in both the terminal device 120 and the network device 110 in terms of D-PUR context.

In some embodiments, the terminal device 120 may intend to adjust the configuration of the PUR if the service data volume or channel conditions need to be changed. Alternatively, the network device 110 may also trigger the PUR reconfiguration (i.e. an adjusting phase) if the network device 110 detects the terminal device 120 request more resources or improper TBS than it actually needs.

For the case that the network device 110 triggers the PUR reconfiguration, the terminal device 120 may perform 235 uplink data transmission. Based on the data transmission, the network device 110 may determine 240 whether that the configuration of PUR is to be adjusted.

In some embodiments, the network device 110 may determine the TBS for the data transmission and compare the TBS with the configured TBS indicated in the configuration of the PUR. If the TBS is less than the configured TBS, it means that the configured TBS may not be used efficiently by the terminal device 120. That is, the configuration of PUR needs to be adjusted and the network device 110 may reconfigure the PUR.

The network device 110 may determine a set of resources for the further transmission. For example, the network device 110 may determine the set of resources for the further transmission based on the TBS, the Coverage Extension Level (CEL) and the repetition number for the further transmission.

Then the network device 110 may transmit 245 an indication indicating that the terminal device 120 to transit to a connected mode via a Narrow Physical Downlink Control Channel (NPDCCH) scrambled with the PUR RNTI allocated to the terminal device 120 in an initial phase. The allocated PUR RNTI may cause the terminal device 120 to monitor the NPDCCH after performing 235 uplink data transmission.

If the terminal device 120 receives the indication for the mode transition in the NPDCCH, the terminal device 120 may re-establish the RRC connection with the network device to receive the reconfiguration. Then the terminal device 120 may transmit 255 a request for the reconfiguration information of the PUR to the network device 110 via the re-established RRC connection. The network device 110 may generate the reconfiguration information of the PUR based on the set of the resources allocated for the further transmission and transmit 260 the reconfiguration information to the terminal device 120. For example, the reconfiguration information may indicate the set of resources, the TBS and the repetition number for the subsequent transmission. Then the network device 110 may update 265 the D-PUR context.

The terminal device may determine 270 a new TBS based on the reconfiguration information and also update 275 the D-PUR context.

Alternatively, the terminal device 120 may trigger the PUR reconfiguration if the service data volume or channel conditions need to be changed. The terminal device 120 may determine 250 an expected TBS for the further transmission.

Then the terminal device 120 may transmit 255 a request for the reconfiguration information of the PUR to the network device 110 via a RRC signaling. The request may indicate the expected TBS. The network device 110 may obtain the expected TBS from the request and determine the set of resources based on the expected TBS. The network device 110 may generate the reconfiguration information of the PUR based on the set of the resources allocated for the subsequent transmission, the expected TBS and the repetition number for the subsequent transmission. Then the network device 110 transmit 260 the reconfiguration information to the terminal device 120. Then the network device 110 may update 265 the D-PUR context. The terminal device 120 may also update 275 the D-PUR context based the received reconfiguration information.

In this way, both the terminal device 120 and the network device 110 may initiate the reconfiguration procedure, so that the PUR and TBS per service may be configured more efficiently and flexibility compared to the EDT.

Alternatively, the network device 110 may also modify the TBS or resources for common PUR. For this purpose, the network device 110 may initiate paging towards the terminal device 120 mapped to these resources to initiate the network triggered reconfiguration.

More details of the example embodiments in accordance with the present disclosure will be described with reference to FIGS. 3-4.

Figure 3:
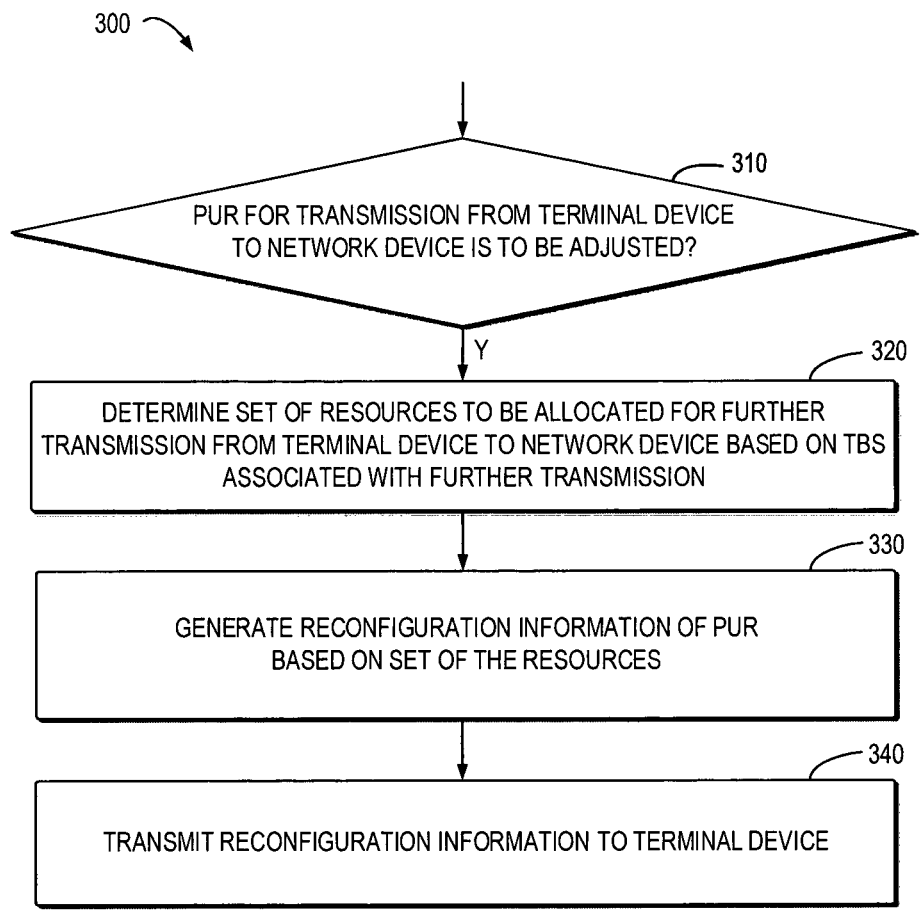
FIG. 3 shows a flowchart of an example method 300 for the resource configuration for NB-IoT according to some embodiments of the present disclosure.

FIG. 3 shows a flowchart of an example method 300 for random access procedure according to some example embodiments of the present disclosure. The method 300 can be implemented at the network device 110 as shown in FIG. 2. For the purpose of discussion, the method 300 will be described with reference to FIG. 2.

At 310, the network device 110 determines whether a Preconfigured Uplink Resource (PUR) for transmission from a terminal device to the network device is to be adjusted.

In some example embodiments, the network device 110 may determine the TBS based on the transmission received from the terminal device and may determine whether the TBS is less than a configured TBS, the configured TBS being predetermined for the transmission by the network device. If the network device 110 determines the TBS is less than a configured TBS, the network device 110 may determine that the PUR is to be adjusted.

In some example embodiments, if the network device 110 receives a request for the reconfiguration information of the PUR from the terminal device, the network device 110 may determine that the PUR is to be adjusted.

At 320, if the network device 110 determines that the PUR is to be adjusted, the network device 110 determines a set of resources to be allocated for further transmission from the terminal device to the network device based on a Transport Block Size (TBS) associated with the further transmission.

In some example embodiments, the network device 110 may determine the TBS and a Coverage Extension Level (CEL) and determine the repetition number for the further transmission based on the TBS and the CEL. The network device 110 may further determine the set of resources based on the TBS and the repetition number.

In some example embodiments, the network device 110 may transmit, to the terminal device, an indication indicating that the terminal device is to be transited from an idle mode to a connected mode via a Narrow Physical Downlink Control Channel (NPDCCH) scrambled with a PUR Radio Network Temporary Identity (RNTI) allocated for the terminal device.

In some example embodiments, the network device 110 may obtain an expected TBS from a request for the reconfiguration information from the terminal device and determine the set of resources based on the expected TBS.

At 330, the network device 110 generates reconfiguration information of the PUR based on the set of the resources.

At 340, the network device 110 transmits the reconfiguration information to the terminal device.

In some example embodiments, if the network device 110 receives a request for the reconfiguration information of the PUR from the terminal device, the network device 110 may generate the reconfiguration information indicating the set of resources, the TBS and the repetition number for the further transmission and transmit the reconfiguration information to the terminal device.

In some example embodiments, if the network device 110 receives a request for the reconfiguration information of the PUR from the terminal device, the network device 110 may generate the reconfiguration information indicating the set of resources, the TBS and the repetition number for the further transmission and transmit the reconfiguration information to the terminal device. The set of resources may be determined based on an expected TBS indicated by the request for the reconfiguration information of the PUR.

Furthermore, in some example embodiments, the network device 110 may determine a configuration of the PUR for the transmission and transmit the configuration of the PUR to the terminal device.

In some example embodiments, if the network device 110 receives a request for the configuration from the terminal device, the network device 110 may obtain an initial TBS for the transmission from the request, the initial TBS being determined by the terminal device and determine the configuration of the PUR based on the initial TBS and Coverage Extension Level (CEL), the configuration at least comprising a configured TBS for the transmission, a set of resources to be allocated for the transmission and a PUR Radio Network Temporary Identity (RNTI) allocated for the terminal device.

In some example embodiments, the network device 110 may determine a configured TBS for the transmission and a set of resources to be allocated for the transmission, and determine the configuration of the PUR based on the configured TBS.

In some example embodiments, the network device 110 may obtain a reference TBS from an Early Data Transmission (EDT) and determine the configure TBS based on the reference TBS.

Figure 4:
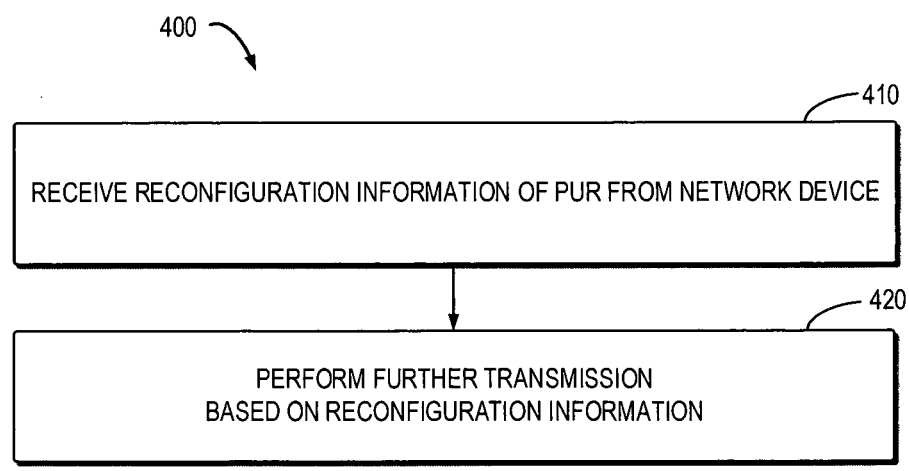
FIG. 4 shows a flowchart of an example method 400 for the resource configuration for NB-IoT according to some embodiments of the present disclosure.

FIG. 4 shows a flowchart of an example method 400 for random access procedure according to some example embodiments of the present disclosure. The method 300 can be implemented at the terminal device 120 as shown in FIG. 2. For the purpose of discussion, the method 400 will be described with reference to FIG. 2.

At 410, the terminal device 120 receives reconfiguration information of a Preconfigured Uplink Resource (PUR) from a network device, the PUR is used for transmission from a terminal device to the network device, the reconfiguration information is generated by the network device based on a set of resources to be allocated for further transmission from the terminal device to the network device, the set of resources being determined by the network device based on a Transport Block Size (TBS) associated with the further transmission in response to determining that the PUR is to be adjusted.

At 420, the terminal device 120 performs the further transmission based on the reconfiguration information.

In some example embodiments, the terminal device 120 may receive from the network device, an indication indicating that the terminal device is to be transited from an idle mode to a connected mode via a Narrow Physical Downlink Control Channel scrambled with a PUR Radio Network Temporary Identity (RNTI) allocated for the terminal device. The terminal device 120 may transmit a request for the reconfiguration information of the PUR to the network device via a high layer signaling re-established based on the indication.

In some example embodiments, if a data volume of the further transmission or a Coverage Extension Level (CEL) is to be changed, the terminal device 120 may determine an expected TBS for the further transmission and transmits a request for the reconfiguration information of the PUR to the network device, the request indicating the expected TBS.

In some example embodiments, if the terminal device 120 receives, from the network device, a System Information Block (SIB) indicating that the PUR is available in a cell served by the network device, the terminal device 120 may determine an initial TBS for the transmission based on a data volume for the transmission and a Coverage Extension Level (CEL). The terminal device 120 may transmit a request for the configuration of the PUR to the network device, the request indicating the initial TBS and the CEL and receive the configuration of the PUR from the network device, the configuration of the PUR being determined by the network device based on the initial TBS and the CEL.

In some example embodiments, the terminal device 120 may receive a configuration of the PUR from the network device, the configuration of the PUR being determined by the network device based on a configured TBS of the transmission.

In some example embodiments, an apparatus capable of performing the method 300 (for example, the network device 110) may comprise means for performing the respective steps of the method 300. The means may be implemented in any suitable form. For example, the means may be implemented in a circuitry or software module.

In some example embodiments, the apparatus comprises: means for determining, at a network device, whether a Preconfigured Uplink Resource (PUR) for transmission from a terminal device to the network device is to be adjusted; means for in response to determining that the PUR is to be adjusted, determining a set of resources to be allocated for further transmission from the terminal device to the network device based on a Transport Block Size (TBS) associated with the further transmission; means for generating reconfiguration information of the PUR based on the set of the resources; and means for transmitting the reconfiguration information to the terminal device.

In some example embodiments, the means for determining whether that the PUR is to be adjusted comprises means for determining the TBS based on the transmission received from the terminal device; means for determining whether the TBS being less than a configured TBS, the configured TBS being predetermined for the transmission by the network device; and means for in response to determining that the TBS being less than with configured TBS, determining that the PUR is to be adjusted.

In some example embodiments, the means for determining whether that the PUR is to be adjusted comprise means for in response to receiving, from the terminal device, a request for the reconfiguration information of the PUR, determining that the PUR is to be adjusted.

In some example embodiments, the means for determining the set of resources comprises means for determining the TBS and a Coverage Extension Level (CEL); means for determining the repetition number for the further transmission based on the TBS and the CEL; and means for determining the set of resources based on the TBS and the repetition number.

In some example embodiments, the means for determining the set of resources further comprising means for transmitting, to the terminal device, an indication indicating that the terminal device is to be transited from an idle mode to a connected mode via a Narrow Physical Downlink Control Channel (NPDCCH) scrambled with a PUR Radio Network Temporary Identity (RNTI) allocated for the terminal device.

In some example embodiments, the means for determining the set of resources comprises means for obtaining an expected TBS from a request for the reconfiguration information from the terminal device; and means for determining the set of resources based on the expected TBS.

In some example embodiments, the means for transmitting the reconfiguration information comprises means for in response to receiving a request for the reconfiguration information of the PUR from the terminal device, generating the reconfiguration information indicating the set of resources, the TBS and the repetition number for the further transmission; and means for transmitting the reconfiguration information to the terminal device.

In some example embodiments, the means for transmitting the reconfiguration information comprises means for in response to receiving a request for the reconfiguration information of the PUR from the terminal device, generating the reconfiguration information indicating the set of resources, the TBS and the repetition number for the further transmission, the set of resources being determined based on an expected TBS indicated by the request for the reconfiguration information of the PUR; and means for transmitting the reconfiguration information to the terminal device.

In some example embodiments, the apparatus may further comprise means for determining a configuration of the PUR for the transmission; and means for transmitting the configuration of the PUR to the terminal device.

In some example embodiments, the means for determining the configuration comprises means for in response to receiving a request for the configuration from the terminal device, obtaining an initial TBS for the transmission from the request, the initial TBS being determined by the terminal device; and means for determining the configuration of the PUR based on the initial TBS and a Coverage Extension Level (CEL), the configuration at least comprising a configured TBS for the transmission, a set of resources to be allocated for the transmission and a PUR Radio Network Temporary Identity (RNTI) allocated for the terminal device.

In some example embodiments, the means for determining the configuration comprises means for determining a configured TBS for the transmission and a set of resources to be allocated for the transmission; and means for determining the configuration of the PUR based on the configured TBS.

In some example embodiments, the means for determining the configured TBS comprises means for obtaining a reference TBS from an Early Data Transmission (EDT); and means for determining the configure TBS based on the reference TBS.

In some example embodiments, an apparatus capable of performing the method 400 (for example, the terminal device 120) may comprise means for performing the respective steps of the method 400. The means may be implemented in any suitable form. For example, the means may be implemented in a circuitry or software module.

In some example embodiments, the apparatus comprises: means for receiving, at a terminal device, reconfiguration information of Preconfigured Uplink Resource (PUR) from a network device, the PUR being used for transmission from a terminal device to the network device, the reconfiguration information being generated by the network device based on a set of resources to be allocated for further transmission from the terminal device to the network device, the set of resources being determined by the network device based on a Transport Block Size (TBS) associated with the further transmission in response to determining that the PUR is to be adjusted; and means for performing the further transmission based on the reconfiguration information.

In some example embodiments, the apparatus may further comprise means for receiving, from the network device, an indication indicating that the terminal device is to be transited from an idle mode to a connected mode via a Narrow Physical Downlink Control Channel scrambled with a PUR Radio Network Temporary Identity (RNTI) allocated for the terminal device and means for transmitting a request for the reconfiguration information of the PUR to the network device via a high layer signaling re-established based on the indication.

In some example embodiments, the apparatus may further comprise means for in response to a data volume of the further transmission or a Coverage Extension Level (CEL) being to be changed, determining an expected TBS for the further transmission; and transmitting a request for the reconfiguration information of the PUR to the network device, the request indicating the expected TBS.

In some example embodiments, the apparatus may further comprise means for in response to receiving, from the network device, a System Information Block (SIB) indicating that the PUR is available in a cell served by the network device, determining an initial TBS for the transmission based on a data volume for the transmission and a Coverage Extension Level (CEL); means for transmitting a request for the configuration of the PUR to the network device, the request indicating the initial TBS and the CEL and means for receiving the configuration of the PUR from the network device, the configuration of the PUR being determined by the network device based on the initial TBS and the CEL.

In some example embodiments, the apparatus may further comprise means for receiving a configuration of the PUR from the network device, the configuration of the PUR being determined by the network device based on a configured TBS of the transmission.

Figure 5:
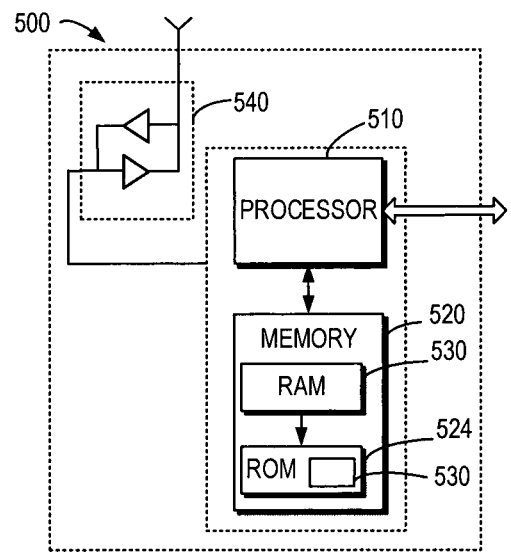
FIG. 5 is a simplified block diagram of a device that is suitable for implementing embodiments of the present disclosure.

FIG. 5 is a simplified block diagram of a device 500 that is suitable for implementing embodiments of the present disclosure. The device 500 may be provided to implement the terminal device 110 or the network device 120 as shown in FIG. 1. As shown, the device 500 includes one or more processors 510, one or more memories 520 coupled to the processor 510, and one or more transmitters and/or receivers (TX/RX) 540 coupled to the processor 510.

The TX/RX 540 is for bidirectional communications. The TX/RX 540 has at least one antenna to facilitate communication. The communication interface may represent any interface that is necessary for communication with other network elements.

The processor 510 may be of any type suitable to the local technical network and may include one or more of the following: general purpose computers, special purpose computers, microprocessors, digital signal processors (DSPs) and processors based on multicore processor architecture, as non-limiting examples. The device 500 may have multiple processors, such as an application specific integrated circuit chip that is slaved in time to a clock which synchronizes the main processor.

The memory 520 may include one or more non-volatile memories and one or more volatile memories. Examples of the non-volatile memories include, but are not limited to, a Read Only Memory (ROM) 524, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 522 and other volatile memories that will not last in the power-down duration.

A computer program 530 includes computer executable instructions that are executed by the associated processor 510. The program 530 may be stored in the ROM 524. The processor 510 may perform any suitable actions and processing by loading the program 530 into the RAM 522.

The example embodiments of the present disclosure may be implemented by means of the program 530 so that the device 500 may perform any process of the disclosure as discussed with reference to FIGS. 2 to 4. The embodiments of the present disclosure may also be implemented by hardware or by a combination of software and hardware.

Figure 6:
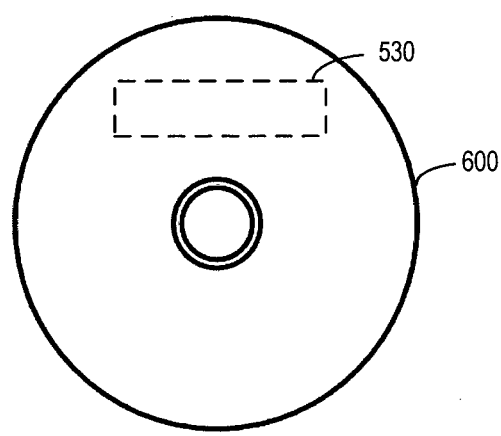
FIG. 6 illustrates a diagram of an example computer readable medium in accordance with some embodiments of the present disclosure.

In some example embodiments, the program 530 may be tangibly contained in a computer readable medium which may be included in the device 500 (such as in the memory 520) or other storage devices that are accessible by the device 500. The device 500 may load the program 530 from the computer readable medium to the RAM 522 for execution. The computer readable medium may include any types of tangible non-volatile storage, such as ROM, EPROM, a flash memory, a hard disk, CD, DVD, and the like. FIG. 6 shows an example of the computer readable medium 600 in form of CD or DVD. The computer readable medium has the program 530 stored thereon.

Generally, various example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. For example, in some embodiments, various examples of the present disclosure (e.g., a method, apparatus or device) may be partly or fully implemented on the computer readable medium. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The units included in the apparatuses and/or devices of the present disclosure may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the apparatuses and/or devices may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

As examples, embodiments of the present disclosure may be described in the context of the computer-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, a computer readable medium may be any tangible medium that may contain, or store a program for use by or in connection with an instruction execution system, apparatus, or device. The computer readable medium may be a machine readable signal medium or a machine readable storage medium. The computer readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain cases, multitasking and parallel processing may be advantageous. Likewise, while several specific example embodiment details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it would be appreciated that the present disclosure defined in the appended claims is not necessarily limited to the specific features or acts described above. Rather, the specific features and acts described above are disclosed as example forms of implementing the claims.

What is claimed is:

1. A method, comprising:
    determining, at a network device that is at a network side of a communication network and serves a terminal device in a cell, to trigger a configuration or a reconfiguration of a Preconfigured Uplink Resource (PUR) for transmission from the terminal device to the network device;
    in response to determining to trigger the configuration or the reconfiguration of the PUR, determining by the network device a set of resources to be allocated for further transmission from the terminal device to the network device based on a Transport Block Size (TBS) associated with the further transmission;
    generating by the network device configuration information or reconfiguration information of the PUR based on the set of the resources; and
    transmitting by the network device the configuration information or reconfiguration information to the terminal device.

2. A non-transitory computer readable medium comprising program instructions for causing an apparatus to perform at least the method of claim 1.

3. A method, comprising:
    receiving, at a terminal device, configuration information or reconfiguration information of a Preconfigured Uplink Resource (PUR) from a network device that is at a network side of a communication network and serves the terminal device in a cell, the PUR being used for transmission from the terminal device to the network device, determination of the configuration information or reconfiguration information being triggered by the network device and determined based on a set of resources to be allocated for further transmission from the terminal device to the network device, the set of resources being determined by the network device based on a Transport Block Size (TBS) associated with the further transmission in response to determining that the PUR; and
    performing the further transmission based on the configuration information or reconfiguration information.

4. A non-transitory computer readable medium comprising program instructions for causing an apparatus to perform at least the method of claim 3.

5. A device, comprising:
    at least one processor; and
    at least one memory storing instructions that, when executed by the at least one processor, cause the device to perform at least-te the following:
    determining, at a network device that is at a network side of a communication network and serves a terminal device in a cell, to trigger a configuration nor a reconfiguration of a Preconfigured Uplink Resource (PUR) for transmission from the terminal device to the network device;
    in response to determining to trigger the configuration nor the reconfiguration of the PUR, determining a set of resources to be allocated for further transmission from the terminal device to the network device based on a Transport Block Size (TBS) associated with the further transmission;
    generating configuration information or reconfiguration information of the PUR based on the set of the resources; and
    transmitting the configuration information or reconfiguration information to the terminal device.

6. The device of claim 5, wherein the instructions, when executed by the least one processor, further cause the device to perform determining to trigger the configuration nor the reconfiguration of the PUR is to be adjusted by:
    determining the TBS based on the transmission received from the terminal device;
    determining whether the TBS being less than a configured TBS, the configured TBS being predetermined for the transmission by the network device; and
    in response to determining that the TBS being less than with configured TBS, determining that the PUR is to be adjusted.

7. The device of claim 5, wherein the instructions, when executed by the least one processor, further cause the device to perform determining whether that the PUR is to be adjusted by:
in response to receiving, from the terminal device, a request for the reconfiguration information of the PUR, determining that the PUR is to be adjusted.

8. The device of claim 5, wherein the instructions, when executed by the least one processor, further cause the device to perform determining the set of resources by:
determining the TBS and a Coverage Extension Level (CEL);
determining a repetition number for the further transmission based on the TBS and the CEL; and
determining the set of resources based on the TBS and the repetition number.

9. The device of claim 8, wherein the instructions, when executed by the least one processor, further cause the device to perform:
transmitting, to the terminal device, an indication indicating that the terminal device is to be transited from an idle mode to a connected mode via a Narrow Physical Downlink Control Channel scrambled with a PUR Radio Network Temporary Identity (RNTI) allocated for the terminal device.

10. The device of claim 5, wherein the instructions, when executed by the least one processor, further cause the device to perform determining the set of resources by:
obtaining an expected TBS from a request for the reconfiguration information from the terminal device; and
determining the set of resources based on the expected TBS.

11. The device of claim 5, wherein the instructions, when executed by the least one processor, further cause the device to perform transmitting the reconfiguration information by:
in response to receiving a request for the reconfiguration information of the PUR from the terminal device, generating the reconfiguration information indicating the set of resources, the TBS and a repetition number for the further transmission; and
transmitting the reconfiguration information to the terminal device.

12. The device of claim 5, wherein the instructions, when executed by the least one processor, further cause the device to perform transmitting the reconfiguration information by:
in response to receiving a request for the reconfiguration information of the PUR from the terminal device, generating the reconfiguration information indicating the set of resources, the TBS and a repetition number for the further transmission, the set of resources being determined based on an expected TBS indicated by the request for the reconfiguration information of the PUR; and
transmitting the reconfiguration information to the terminal device.

13. The device of claim 5, wherein the instructions, when executed by the least one processor, further cause the device to perform:
determining a configuration of the PUR for the transmission; and
transmitting the configuration of the PUR to the terminal device.

14. The device of claim 13, wherein the instructions, when executed by the least one processor, further cause the device to perform determining the configuration by:
determining the configuration of the PUR based on an initial TBS and a Coverage Extension Level (CEL), the configuration at least comprising a configured TBS for the transmission, a set of resources to be allocated for the transmission and a PUR Radio Network Temporary Identity (RNTI) allocated for the terminal device.

15. The device of claim 13, wherein the instructions, when executed by the least one processor, further cause the device to perform determining the configuration by:
determining a configured TBS for the transmission and a set of resources to be allocated for the transmission; and
determining the configuration of the PUR based on the configured TBS.

16. The device of claim 15, wherein the instructions, when executed by the least one processor, further cause the device to perform determining the configured TBS by:
obtaining a reference TBS from an Early Data Transmission (EDT); and
determining the configure TBS based on the reference TBS.

17. A device, comprising:
at least one processor; and
at least one memory storing instructions that, when executed by the at least one processor, cause the device to perform at least the following:
receive, at a terminal device, configuration information or reconfiguration information of Preconfigured Uplink Resource (PUR) from a network device that is at a network side of a communication network and serves the terminal device in a cell, the PUR being used for transmission from the terminal device to the network device, determination of the configuration information or reconfiguration information being triggered by the network device and determined based on a set of resources to be allocated for further transmission from the terminal device to the network device, the set of resources being determined by the network device based on a Transport Block Size (TBS) associated with the further transmission in response to determining that the PUR; and
perform the further transmission based on the configuration information or reconfiguration information.

18. The device of claim 17, wherein the instructions, when executed by the least one processor, further cause the device to perform:
receiving the configuration of the PUR from the network device, the configuration of the PUR being determined by the network device based on an initial TBS and a coverage extension level.

19. The device of claim 17, wherein the instructions, when executed by the least one processor, further cause the device to perform:
receiving a configuration of the PUR from the network device, the configuration of the PUR being determined by the network device based on a configured TBS of the transmission.

* * * * *